(12) United States Patent
Fox et al.

(10) Patent No.: US 10,063,414 B2
(45) Date of Patent: Aug. 28, 2018

(54) UPDATING A TRANSPORT STACK IN A CONTENT CENTRIC NETWORK

(71) Applicant: CISCO TECHNOLOGY, INC., San Jose, CA (US)

(72) Inventors: Kevin C. Fox, San Jose, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 15/154,837

(22) Filed: May 13, 2016

(65) Prior Publication Data

US 2017/0331685 A1  Nov. 16, 2017

(51) Int. Cl.
*G06F 15/173* (2006.01)
*H04L 12/24* (2006.01)
*H04L 29/06* (2006.01)
*H04L 29/08* (2006.01)

(52) U.S. Cl.
CPC ...... *H04L 41/0816* (2013.01); *H04L 65/1083* (2013.01); *H04L 67/06* (2013.01); *H04L 69/26* (2013.01); *H04L 65/608* (2013.01); *H04L 67/146* (2013.01)

(58) Field of Classification Search
CPC ... H04L 65/1083; H04L 65/608; H04L 67/06; H04L 67/146
See application file for complete search history.

(56) References Cited

U.S. PATENT DOCUMENTS

| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |

(Continued)

FOREIGN PATENT DOCUMENTS

| CN | 103873371 | | 6/2014 |
| DE | 1720277 | A1 | 6/1967 |

(Continued)

OTHER PUBLICATIONS

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf paragraphs [01.3], [002], [02.1], [0003].

(Continued)

*Primary Examiner* — Kyung H Shin

(57) ABSTRACT

One embodiment provides a transport stack updating system that facilitates updating a component of a transport stack of a computer system. During operation, the system sets, by a component of the transport stack, a state of the component as quiesced in response to receiving a pause message. A component in the quiesced state is precluded from processing an interest or a content object. The system determines whether the pause message triggers a rejection passes an acknowledgment message of the pause message up the transport stack. The acknowledgment message indicates that the pause message has been successfully processed by a respective component of the transport stack.

20 Claims, 11 Drawing Sheets

(56) References Cited

U.S. PATENT DOCUMENTS

| | | |
|---|---|---|
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |

(56) References Cited

U.S. PATENT DOCUMENTS

| | | |
|---|---|---|
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133275 A1 | 6/2006 | Dabagh et al. |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |

(56) References Cited

U.S. PATENT DOCUMENTS

| | | |
|---|---|---|
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |

(56) References Cited

U.S. PATENT DOCUMENTS

| | | |
|---|---|---|
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0315235 A1* | 11/2013 | Foo .................. H04L 67/06 370/389 |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0253674 A1* | 9/2014 | Grondal ............ H04L 65/1083 348/14.08 |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |

(56) References Cited

FOREIGN PATENT DOCUMENTS

| | | |
|---|---|---|
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David Fl Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc. downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.

(56) References Cited

OTHER PUBLICATIONS

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer ScienceVolume 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.

(56) References Cited

OTHER PUBLICATIONS

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM Sigcomm Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

Schein, Jeffrey, and Steven I. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

(56) References Cited

OTHER PUBLICATIONS

S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
International Search Report and Written Opinion in counterpart International Application No. PCT/US2017/031126, dated Jul. 21, 2017, 14 pages.
Rosa, et al., "Building Adaptive Systems with Service Composition Frameworks," in OTM 2007: On the Move to Meaningful Internet Systems 2007: CoopIS, DOA, ODBASE, GADA, and IS, Nov. 2007, 18 pages.
Gazis, et al., "A Survey of Dynamically Adaptable Protocol Stacks," IEEE Communications Surveys & Tutorials, vol. 12, No. 1, Jan. 2010, 21 pages.
Rosa, et al., "Building Adaptive Services for Distributed," Oct. 2007, http://repositorio.ul.pt/bitstream/10455/2974/1/07-21.pdf, 20 pages.

\* cited by examiner

UPDATING A TRANSPORT STACK IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/595,060, entitled "AUTO-CONFIGURABLE TRANSPORT STACK," by inventors Ignacio Solis and Glenn C. Scott, filed 12 Jan. 2015 (hereinafter "U.S. patent application Ser. No. 14/595,060");

the disclosures of which are herein incorporated by reference in their entirety.

BACKGROUND

Field

This disclosure is generally related to a transport framework. More specifically, this disclosure is related to a method and system for facilitating command messages to be communicated in a layer-agnostic manner between components of the same or different stacks.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified by their unique names, which are typically hierarchically structured variable-length identifiers (HSVLI). An HSVLI can include contiguous name components ordered from a most general level to a most specific level.

A CCN node implements a transport stack, which includes layers of independent components that forward messages to one another. A component in the stack can also be referred to as a module. The stack is assembled and initialized at when a CCN node is initiated. The stack implements CCN protocols and integrates external services, such as caches, identity, key, and certificate services. The stack also facilitates control messages to coordinate operations. The node uses the stack to forward messages with interests and content objects.

Each component of the stack can process the messages in either direction. This can change the system state of the node or modify message contents. Furthermore, the component may queue the messages or generate new messages. In addition, the node can modify the transport stack (e.g., can insert a new component or remove an existing component). Such modifications may require coordination among the components. In order to avoid duplicate or interfering operations by the components, configuration, control, and management of the components may require the ability to guarantee a known state for a period of time necessary to implement and activate new state or change its configuration.

SUMMARY

One embodiment provides a transport stack updating system that facilitates updating a component of a transport stack of a computer system. During operation, the system sets, by a component of the transport stack, a state of the component as quiesced in response to receiving a pause message. A component in the quiesced state is precluded from processing an interest or a content object. The system determines whether the pause message triggers a rejection passes an acknowledgment message of the pause message up the transport stack. The acknowledgment message indicates that the pause message has been successfully processed by a respective component of the transport stack.

In a variation on this embodiment, the component is a final component of the transport stack. The system then generates the acknowledgment message in response to receiving the pause message.

In a variation on this embodiment, the system receives an update message and, in response, updates the component based on the content of the update message.

In a variation on this embodiment, the system sends an update failure message up the transport stack in response to determining that the pause message triggers a rejection.

In a further variation, reasons for rejection include one or more of: a stack component detecting a timeout event, processing a back flow, or identifying inter-dependent messages.

In a variation on this embodiment, the system sets the state of the component as active in response to receiving a resume message. A component in the active state resumes processing an interest or a content object.

In a variation on this embodiment, the pause message is an interest message. The system then transfers control to an administrator agent for updating the component.

In a variation on this embodiment, a name for a component of the transport stack is based on one or more of: a hierarchically structured variable length identifier (HSVLI), which comprises contiguous name components ordered from a most general level to a most specific level, wherein the HSVLI is applicable in a portal instance corresponding to the stack; a flat name that does not indicate any hierarchy; a role of the component of the stack; and a unique identifier which is specific to the component of the stack.

BRIEF DESCRIPTION OF THE FIGURES

In the figures, like reference numerals refer to the same figure elements.

DETAILED DESCRIPTION

Figure 1A:
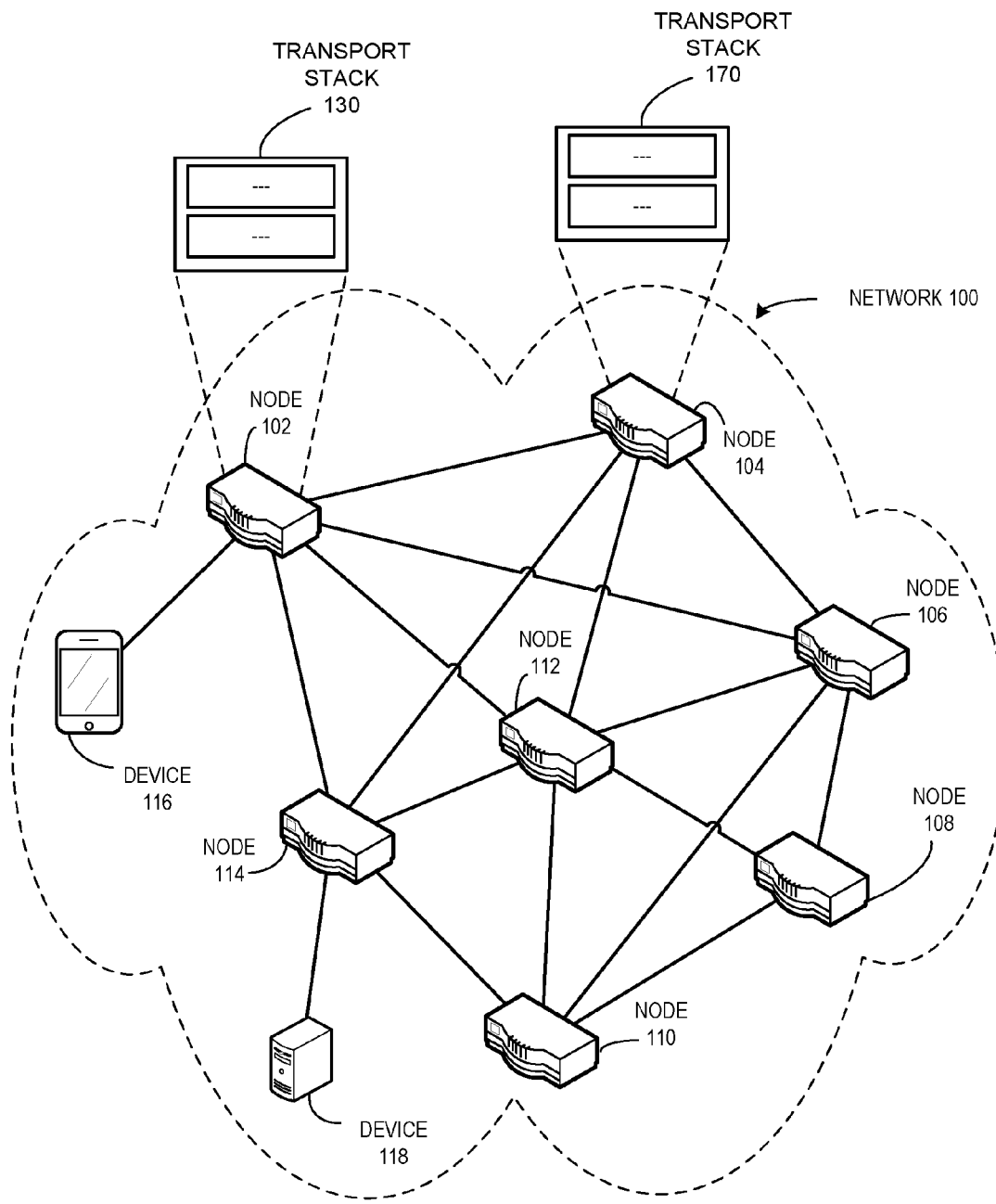
FIG. 1A illustrates an exemplary content centric network (CCN) that facilitates updating a transport stack based on quiescing, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of efficiently updating a stack module of a CCN node by quiescing the stack components during the updating process. In this way, the operations required for the update can be executed without interruption before the stack is allowed to continue regular operations. The node provides a set of network components that can be combined into a transport "stack" that achieves communication functionality.

Each of the components within a transport stack performs a specific function, and some components can implement a functionality that is more specific or more generic than other versions of the same component. Some components may take parameters at load time that define their behavior, and some components may be configured at runtime based on parameters that they receive from a local application or from a device over the network. For example, some components may adapt to changing operating environment conditions or network conditions over time. The transport stack provides a way for configuration messages and information to be sent between the components, thereby allowing components within the stack to communicate with each other.

In some embodiments, an administrator agent of the CCN node can update a component of the stack (e.g., add a new component or update an existing component). To ensure consistency, the agent sends a pause message down the stack. A component receives the pause message and flushes the local buffer (e.g., empties the message buffer associated with the component). The component stops further processing of messages (e.g., interests and content objects), sets the local state as "quiesced," and passes the pause message down the stack to the next component.

When the pause message reaches the final component of the stack, which is typically a forwarder adapter, the final component flushes the local buffer and sets the local state as quiesced. The final component then generates an acknowledgment message and sends the acknowledgment message up the stack. A respective component passes the acknowledgment message up the stack. The agent receives the acknowledgment message and determines that the stack has been successfully quiesced. The agent then passes an update message down the stack and updates the component. When the component is updated, the agent passes a resume message down the stack, thereby instructing a respective component to resume operation.

In some embodiments, a transport stack operates under the CCN architecture. In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independently of the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location-independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented, prefix-major fashion to form the name "/parc/home/ccn/test.txt." Thus, the name "/parc/home/ccn" can be a "parent" or "prefix" of "/parc/home/ccn/test.txt." Additional components can be used to distinguish among different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "lci" and "ccnx" refer to labeled content information and indicate a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment, which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary content centric network (CCN) that facilitates updating a transport stack based on quiescing, in accordance with an embodiment of the present invention. A network 100, which can be a CCN, can include a client device 116, a content-producing device 118, and a router or other forwarding device at nodes 102, 104, 106, 108, 110, 112, and 114. A node can be a computer system, an endpoint representing users, and/or a device that can generate an interest or originate a content object. Suppose that nodes 102 and 104 have transport stacks 130 and 170, respectively. In a CCN node, the transport stack is often configured based on instructions from an administrator agent. Transport stacks 130 and 170 are usually modified by explicit administrative commands at runtime.

To update stack 130, node 102 typically quiesces stack 130 so that the operations associated with the update can be executed without interruption before stack 130 is allowed to continue regular operations. Similarly, node 104 typically quiesces stack 170 to update stack 170. Node 102 can quiesce the entire stack (e.g., each component of stack 130) and all message transmissions, or only specific messages or messages matching a specific set of rules.

In some embodiments, node 102 passes a pause message down stack 130. This pause message can be an interest for a name that each stack component recognizes and processes. Upon receiving the pause message, a respective component of stack 130 flushes its buffer and pauses its operations. When node 102 completes updating one or more components of stack 130, node 102 sends a resume message via stack 130. This resume message can be a content object associated with the name. Upon receiving the resume message, a respective component of stack 130 resumes its operations. In this way, the operations required for updating stack 130 can be executed without interruption before stack 130 is allowed to continue regular operations.

Figure 1B:
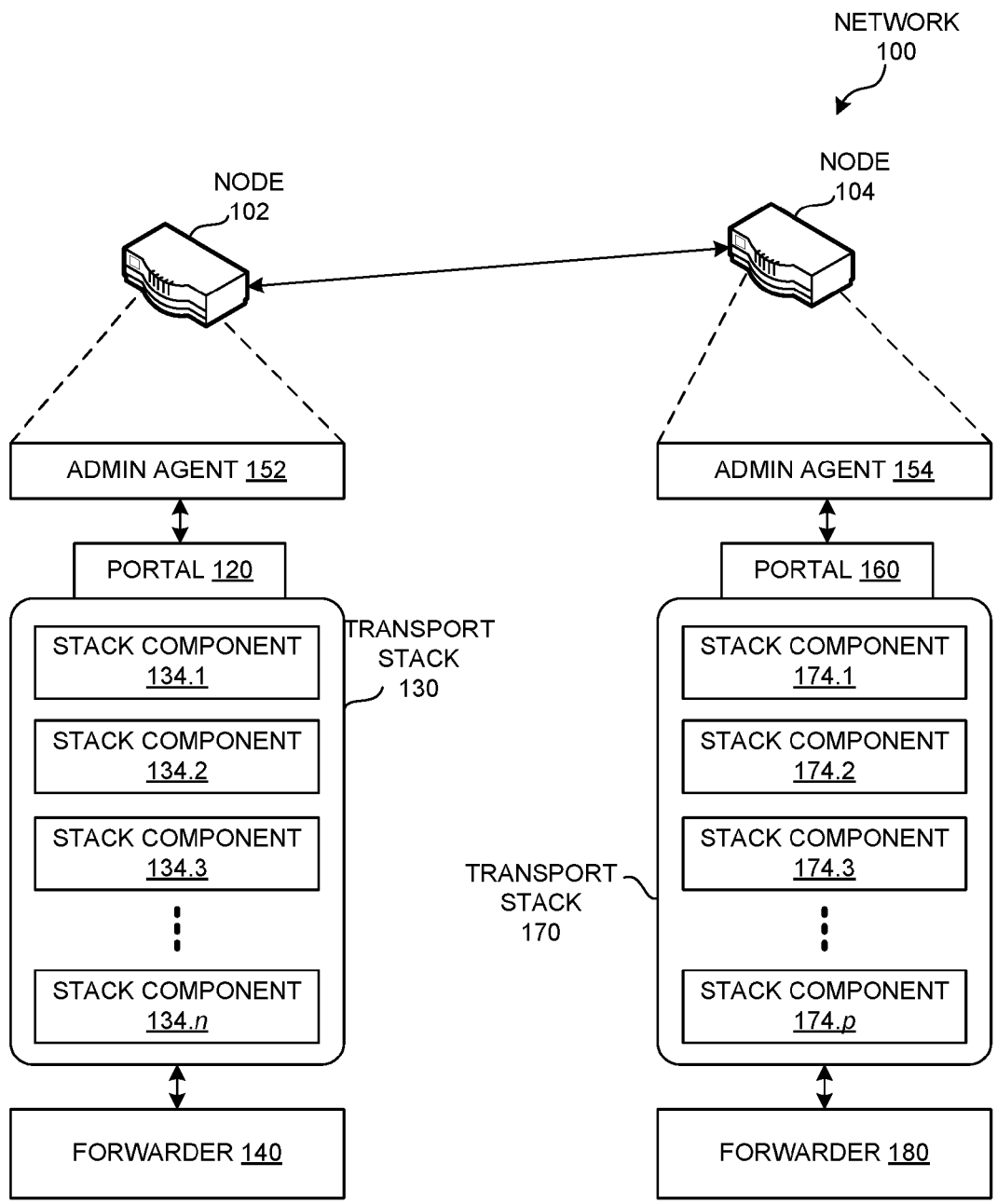
FIG. 1B illustrates an exemplary transport stack of a CCN node, in accordance with an embodiment of the present invention.

FIG. 1B illustrates an exemplary transport stack of a CCN node, in accordance with an embodiment of the present invention. In this example, node 102 can include an administrator agent 152, which communicates with transport stack 130 via a portal 120. Transport stack 130 can include stack components 134.1-134.n. Node 102 can also include forwarder 140 (e.g., a network interface card, or a router in a local area network), which can transfer packets between stack 130 (and individual stack components) and network 100. Similarly, node 104 can include administrator agent 154, which communicates with transport stack 170 via portal 160. Transport stack 170 can include stack components 174.1-174.p. Node 104 can also include a forwarder 180, which can transfer packets between stack 170 (and individual stack components) and network 100. Forwarders 140 and 180 can also facilitate the transfer of packets directly between individual stack components 134.1-134.n and 174.1-174.p, respectively.

Administrator agent 152 can issue a pause message for stack 130. In some embodiments, the head of stack 130 (e.g., stack component 134.1, which is typically an application program interface (API) adapter), can also issue the pause message. Upon receiving the message, each component flushes its current buffer, quiesces local operations, and forwards the message via stack 130. In some embodiments, the final component of stack 130, which is stack component 134.n, can send an acknowledgment up stack 130. Agent 152 can specify a lifetime (e.g., a timeout period) for the pause message for a respective stack component. If a timer representing the lifetime expires before receiving the acknowledgment, the stack component detects a timeout event, determines that the pause operation has failed, and resumes regular operations. Since the acknowledgment is not passed up stack 130, the timeout event is propagated via stack 130 to agent 152, thereby resuming operations of a respective stack component.

On the other hand, if the stack component receives the acknowledgment within the lifetime, the stack component passes the acknowledgment up stack 130. Agent 152 receives the acknowledgment and determines that stack 130 has been quiesced. Agent 152 then updates one or more components of stack 130. When the update operation is completed, agent 152 (or the head of stack 130) sends a resume message down stack 130. Upon receiving the message, a respective component restarts regular operations. In some embodiments, stack component 134.n can send a pause content object associated with the name up stack 130. When a stack component receives the content object, the component resumes its regular operation and passes the content object up stack 130.

In some embodiments, the pause message is applied only to a specific namespace. Any interest or content object with a name in that namespace is flushed at stack 130 and is precluded from being processed at stack 130. However, any interest or content object with a name outside of that namespace is processed based on regular operations of stack 130. In some embodiments, a stack component can reject the pause message and respond with a pause failure message with an optional reason for the rejection. Reasons for rejection include, but are not limited to, a stack component detecting a timeout event, processing a back flow, or identifying inter-dependent messages.

Exemplary Quiescing of a Transport Stack

Figure 2A:
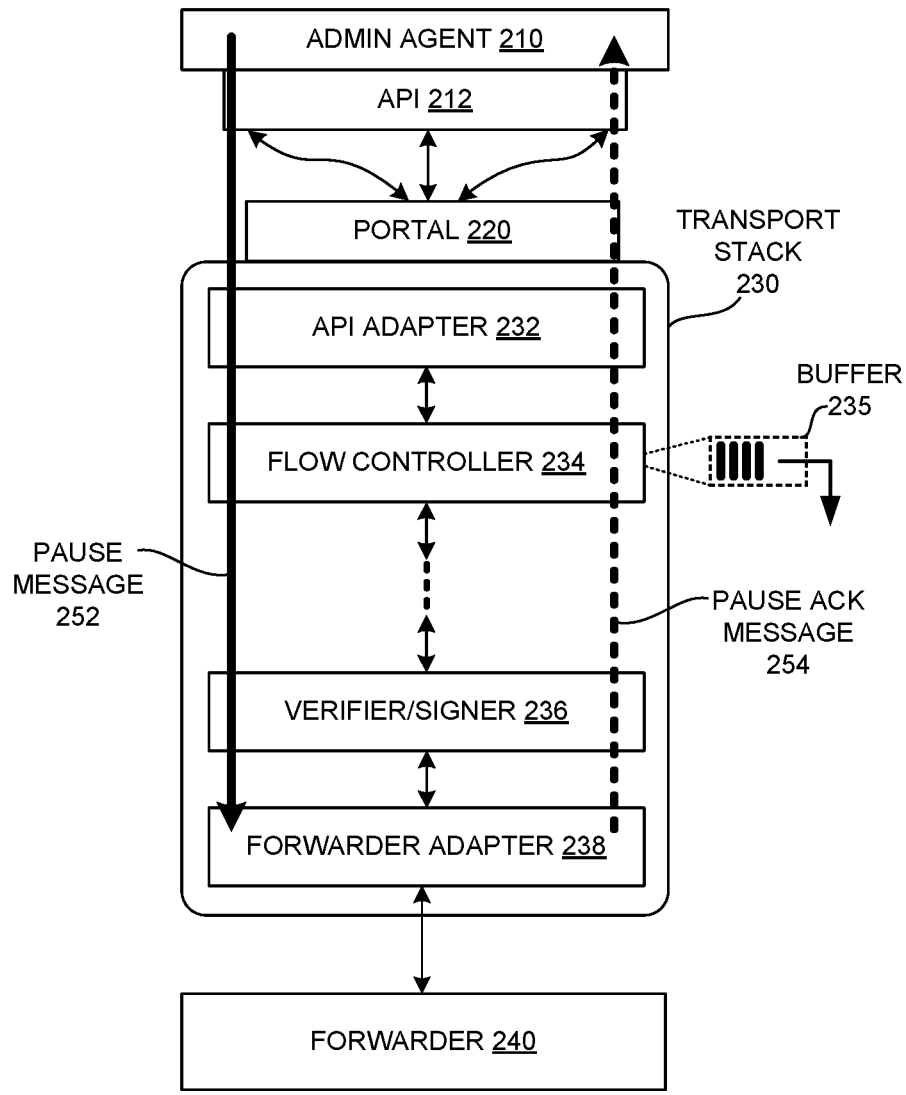
FIG. 2A illustrates an exemplary communication that initiates quiescing of a transport stack, in accordance with an embodiment of the present invention.

FIG. 2A illustrates an exemplary communication that initiates quiescing of a transport stack, in accordance with an embodiment of the present invention. In this example, an administrator agent 210 uses API 212 to communicate with a portal 220, which interacts with a transport stack 230. In FIG. 2A, transport stack 230 includes stack components 232-238. An API adapter 232 can communicate with one or more transport components of transport stack 230. A flow controller 234 can shape and manage traffic, pipeline and transmit interests, and order content objects. A verifier/signer 236 can encode and sign content objects destined for a network element, decode and verify content objects destined for an associated application, encode interests destined for a network element, and decode interests destined for an associated application.

A forwarder adapter 238, which is typically the final component of stack 230, can communicate with a forwarder 240. Forwarder 240 can communicate with other forwarders over a CCN. Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

In some embodiments, administrator agent 210 can update a component of stack 230 (e.g., add a new component or update an existing component). To ensure consistency, agent 210 sends a pause message 252 down stack 230. A respective component of stack 230 receives pause message 252 and flushes its local buffer, if any. Some components may just receive and process a message (e.g., an interest or a content object), while other components can buffer messages. Suppose that flow controller 234 stores messages in a buffer 235. Upon receiving pause message 252, flow controller 234 flushes buffer 235 (e.g., discards the messages stored in buffer 235). Upon receiving pause message 252, a respective component stops further processing of messages, sets the local state as "quiesced," and passes pause message 252 down stack 230 to the next component.

When the pause message reaches the final component of stack 230, which is forwarder adapter 238, forwarder adapter 238 also flushes the local buffer, if any, and sets the local state as quiesced. Forwarder adapter 238 then generates a pause acknowledgment message 254 and sends acknowledgment message 254 up stack 230. A respective component receives acknowledgment message 254 without a timer expiring for pause message 252, and the component passes acknowledgment message 254 up stack 230. Agent 210 receives acknowledgment message 254 and determines that stack 230 has been successfully quiesced.

Figure 2B:
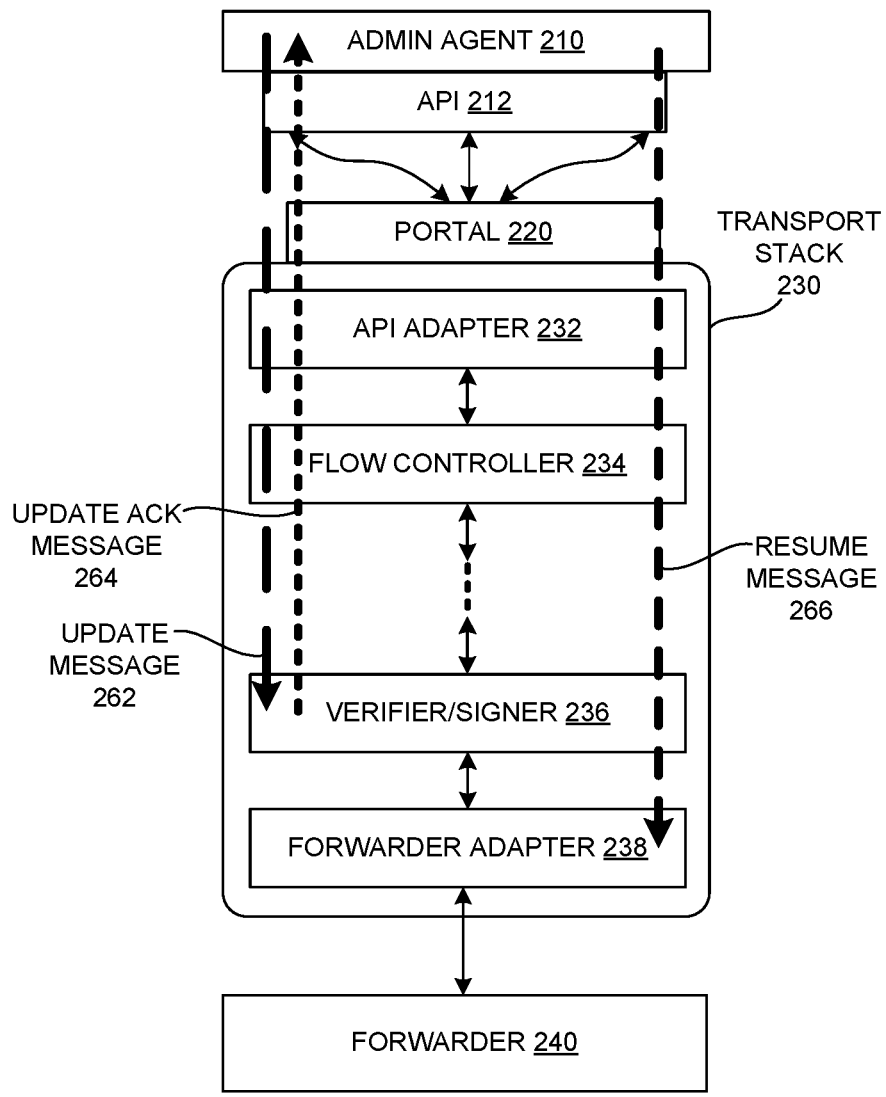
FIG. 2B illustrates an exemplary communication that updates a transport stack, in accordance with an embodiment of the present invention.

FIG. 2B illustrates an exemplary communication that updates a transport stack, in accordance with an embodiment of the present invention. In this example, upon receiving an acknowledgment message, agent 210 determines that stack 230 has been successfully quiesced. Agent 210 then passes an update message comprising the updates for a stack component. Suppose that agent 210 is updating the verification protocol of verifier/signer 236. Agent 210 then generates an update message 262 comprising the updated verification protocol and passes update message 262 down stack 230. Verifier/signer 236 receives update message 262 from upper components of stack 230, obtains the updated verification protocol from update message 262, and updates verifier/signer 236.

In some embodiments, verifier/signer 236 generates an update acknowledgment message 264 and sends acknowledgment message 264 up stack 230. A respective component passes acknowledgment message 264 up stack 230. Agent 210 receives acknowledgment message 264 and determines that verifier/signer 236 has been successfully updated. Agent 210 then generates a resume message 266 and passes resume message 266 down stack 230, thereby instructing a respective component to resume operation. Upon receiving resume message 266, a respective component resumes processing of messages, sets the local state as "active," and passes resume message 266 down stack 230 to the next component. When resume message 266 reaches forwarder adapter 238, forwarder adapter 238 resumes processing of messages and sets the local state as "active."

Figure 2C:
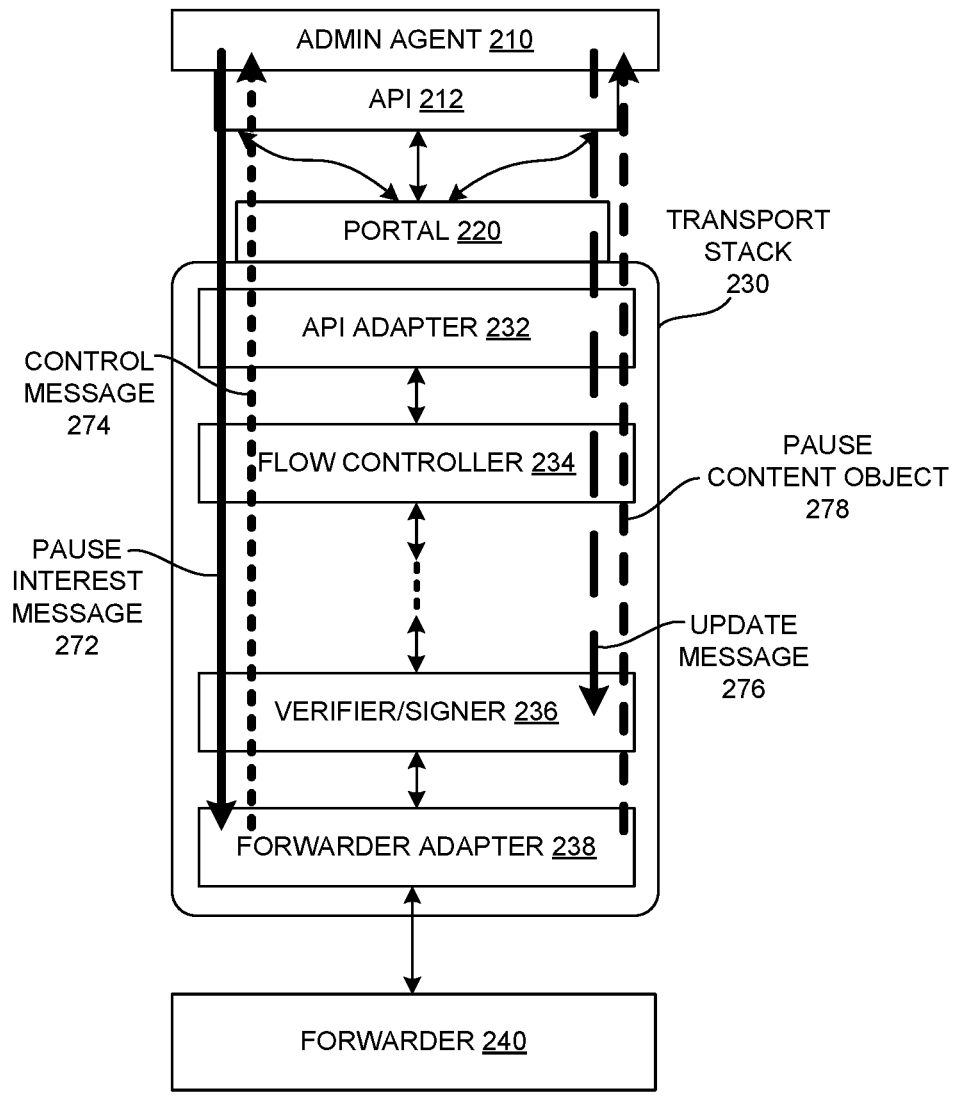
FIG. 2C illustrates an exemplary communication that updates a transport stack based on control sharing, in accordance with an embodiment of the present invention.

FIG. 2C illustrates an exemplary communication that updates a transport stack based on control sharing, in accordance with an embodiment of the present invention. In this example, a pause interest message 272 is sent down transport stack 230 with a pre-agreed-upon name that each component is capable of recognizing and processing. Agent 210 (or head of stack 230, which is API adapter 232) can generate and send pause interest message 272. Upon receiving pause interest message 272, a respective component of stack 230 flushes its current buffer, forwards pause interest message 272 via stack 230, quiesces the local component, and waits for a content object return matching pause interest message 272 before processing or forwarding any other messages.

Typically, forwarder adapter 238 is the final component to receive pause interest message 272. When pause interest message 272 reaches forwarder adapter 238, forwarder adapter 238 quiesces the local component and determines that a respective component between forwarder adapter 238 and API adapter 232 has been quiesced. Forwarder adapter 238 then passes control to agent 210. In some embodiments, forwarder adapter 238 sends a control message 274 (e.g., an inter-process message) to agent 210 via stack 230 to pass the control.

Suppose that agent 210 is updating the verification protocol of verifier/signer 236. Agent 210 then generates an update message 276 comprising the updated verification protocol and passes update message 276 down stack 230. Verifier/signer 236 receives update message 276 from the upper components of stack 230, obtains the updated verification protocol from update message 276, and updates verifier/signer 236.

When the updating process is completed, agent 210 passes the control back to forwarder adapter 238 (e.g., using a control message, which is not shown in FIG. 2C). Forwarder adapter 238 constructs a matching pause content object 278 and sends pause content object 278 back up transport stack 230. Upon receiving pause content object 278, a respective component restarts regular operation and sends pause content object 278 onward via stack 230. Once pause content object 278 reaches agent 210 (or API adapter 232), transport stack 230 resumes its regular operations.

Figure 2D:
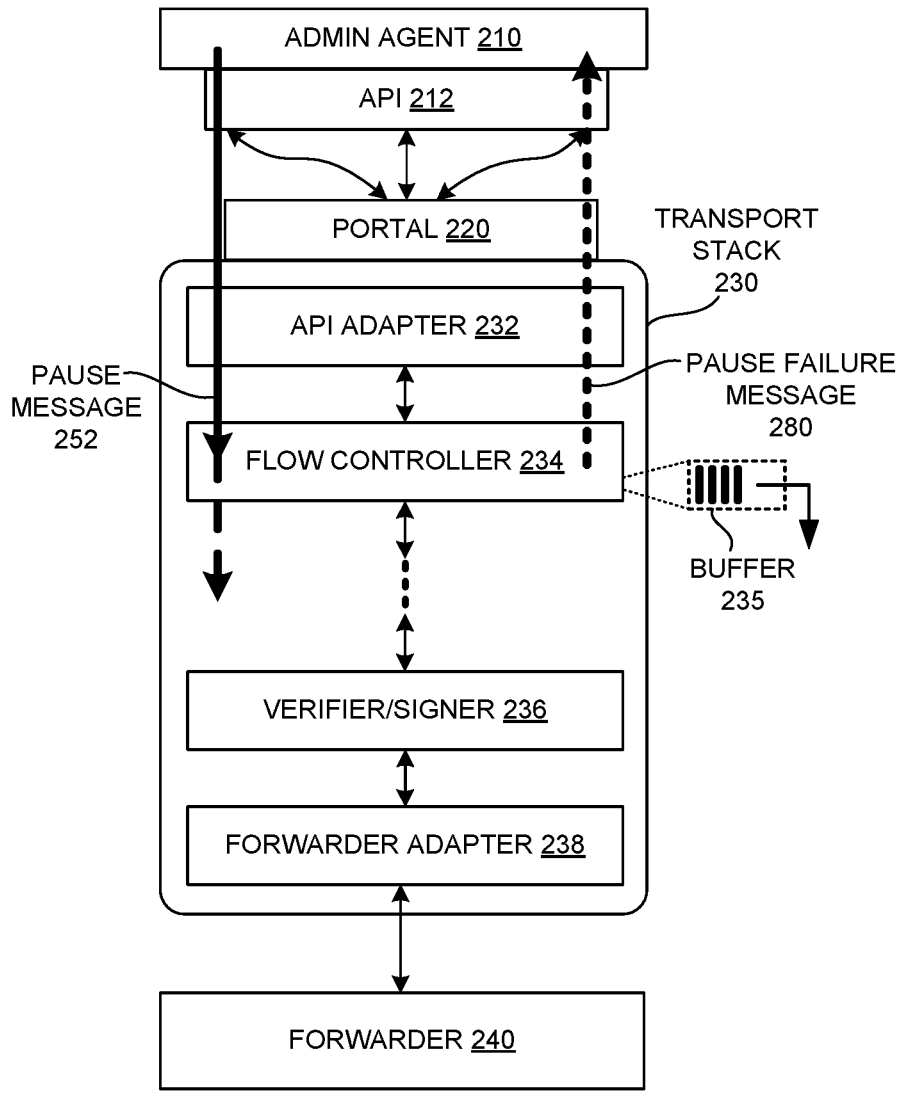
FIG. 2D illustrates an exemplary communication of an unsuccessful quiescing of a transport stack, in accordance with an embodiment of the present invention.

FIG. 2D illustrates an exemplary communication of an unsuccessful quiescing of a transport stack, in accordance with an embodiment of the present invention. In some embodiments, a stack component can reject a pause message and respond with a pause failure message with an optional reason for the rejection. Reasons for rejection include, but are not limited to, a stack component detecting a timeout event, processing a back flow, or identifying inter-dependent messages. Suppose that flow controller 234 fails to process pause message 252 (e.g., being unable to flush buffer 235 due to inter-dependencies). As a result, flow controller 234 rejects pause message 252, generates a pause failure message 280 comprising the reason for the rejection, and passes pause failure message 280 upward via stack 230.

When pause failure message 280 reaches an upstream stack component, such as API adapter 232, the stack component determines that pause message 252 has been rejected, restarts regular operation, and sends pause failure message 280 onward via stack 230. Upon receiving pause failure message 280, agent 210 determines that pause message 252 has been rejected. Agent 210 can wait for a period of time (e.g., a random back-off or a pre-determined time) and re-issue pause message 252.

Operations

Figure 3:
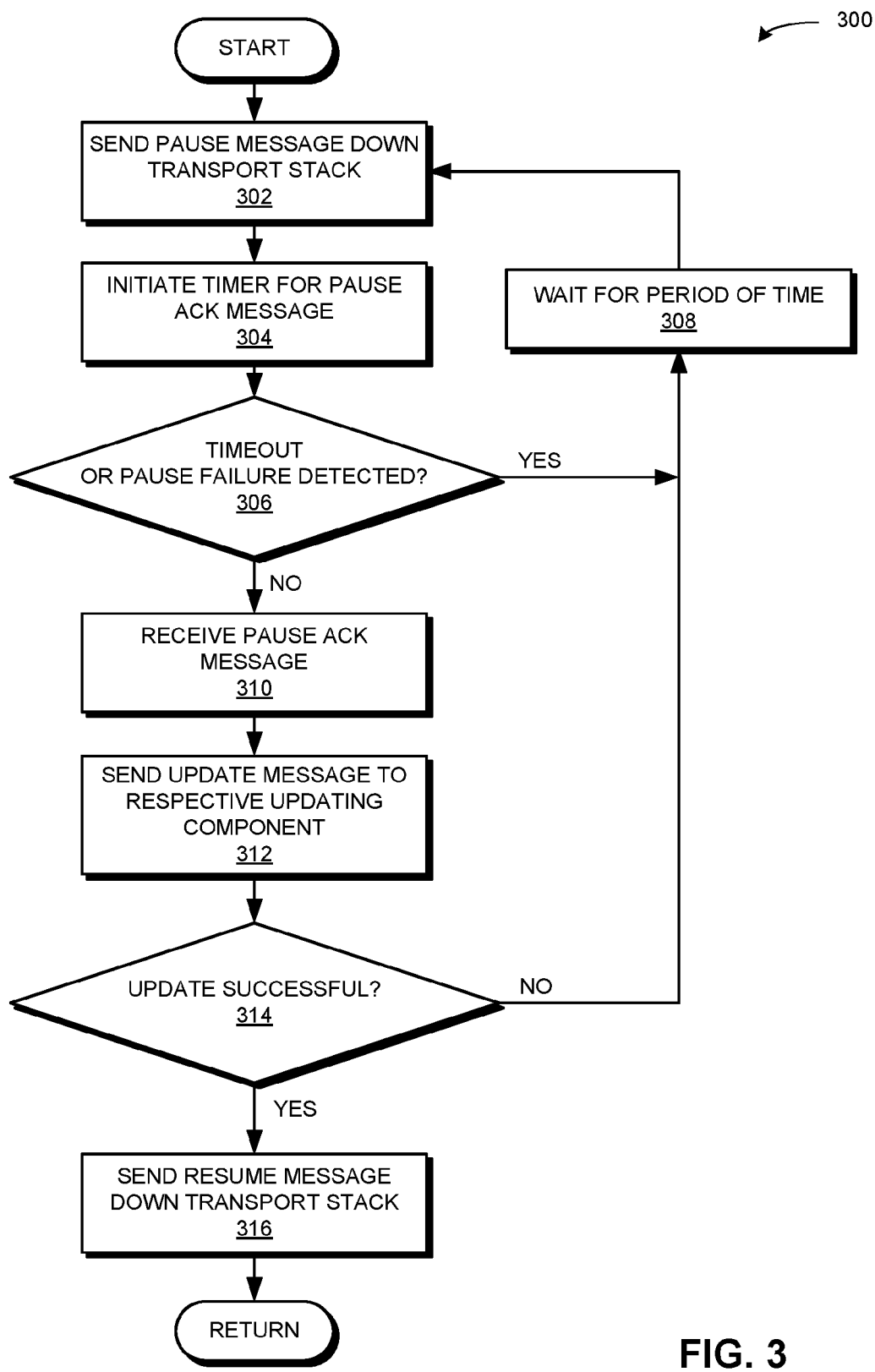
FIG. 3 presents a flow chart illustrating a method for quiescing and updating a transport stack, in accordance with an embodiment of the present invention.

FIG. 3 presents a flow chart 300 illustrating a method for quiescing and updating a transport stack, in accordance with an embodiment of the present invention. During operation, an administrator agent (or the head of the stack) sends a pause message down the transport stack (operation 302) and initiates a timer for a pause acknowledgment message (operation 304). The agent checks whether the agent has detected a timeout or a pause failure message (operation 306). If the agent detects a timeout or a pause failure message, the agent waits for a period of time (e.g., based on random back-off or a pre-determined configuration) (operation 308) and sends another pause message down the transport stack (operation 302). If the agent doesn't detect a timeout or a pause failure message, the agent receives a pause acknowledgment message (operation 310).

The agent then determines that the stack has been quiesced. The agent sends an update message to a respective updating component (i.e., the component that the agent is updating) (operation 312). The update message comprises the update for the updating component. The agent then checks whether the update has been successful (operation 314). In some embodiments, the agent determines that the update has been successful upon receiving an acknowledgment for the update message. If the agent determines that the update has not been successful, the agent waits for a period of time (operation 308) and sends another pause message down the transport stack (operation 302). If the agent determines that the update has been successful, the agent sends a resume message down the transport stack (operation 316).

Figure 4A:
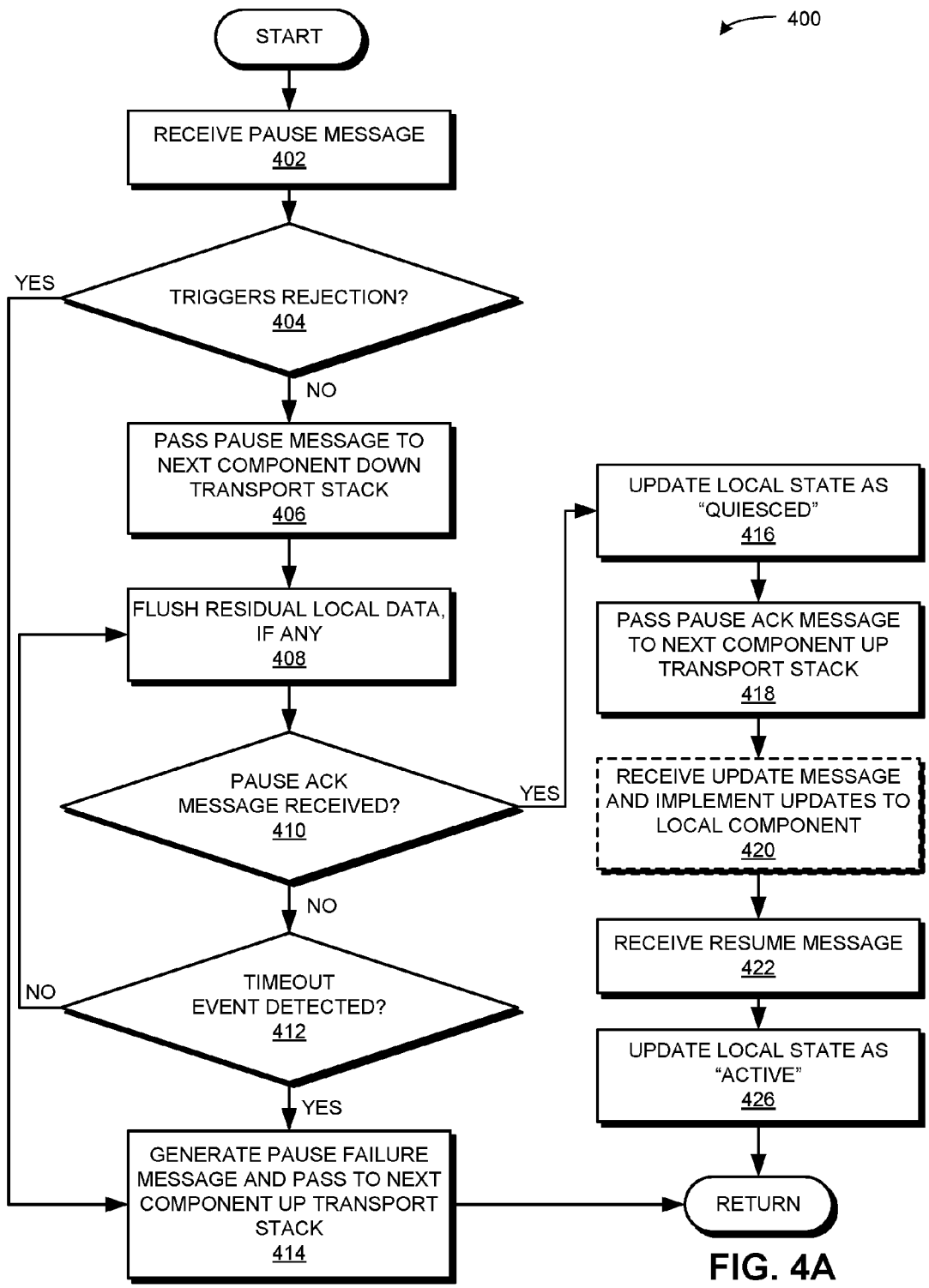
FIG. 4A presents a flow chart illustrating a method for quiescing and updating a module of a transport stack, in accordance with an embodiment of the present invention.

FIG. 4A presents a flow chart 400 illustrating a method for quiescing and updating a module of a transport stack, in accordance with an embodiment of the present invention. During operation, a stack component, which is not the final component of the stack, receives a pause message (operation 402) and checks whether the pause message triggers a rejection (operation 404). Reasons for rejection include, but are not limited to, processing a back flow or identifying inter-dependent messages. If the pause message does not trigger a rejection, the component passes the pause message to the next component down the transport stack (operation 406) and flushes residual local data, if any (operation 408).

The component then checks whether the component has received a pause acknowledgment message (operation 410). If the component has not received a pause acknowledgment message, the component checks for a timeout event (operation 412). If the component detects a timeout event or the pause message triggers a rejection (operation 404), the component generates a pause failure message and passes the pause failure message to the next component up the transport stack (operation 414). On the other hand, if the component has not received a pause acknowledgment message (operation 410) and doesn't detect a timeout event (operation 412), the component continues to flush residual local data, if any (operation 408).

If the component receives a pause acknowledgment message (operation 410), the component sets the local state as "quiesced" (operation 416) and passes the pause acknowledgment message to the next component up the transport stack (operation 418). If the component is the updating component (denoted with dashed line), the component receives an update message and implements updates to the local component (operation 420). In some embodiments, the component can send an acknowledgment up the stack upon successfully updating the local component. The component then receives a resume message (operation 422) and sets the local state as "active" (operation 426).

Figure 4B:
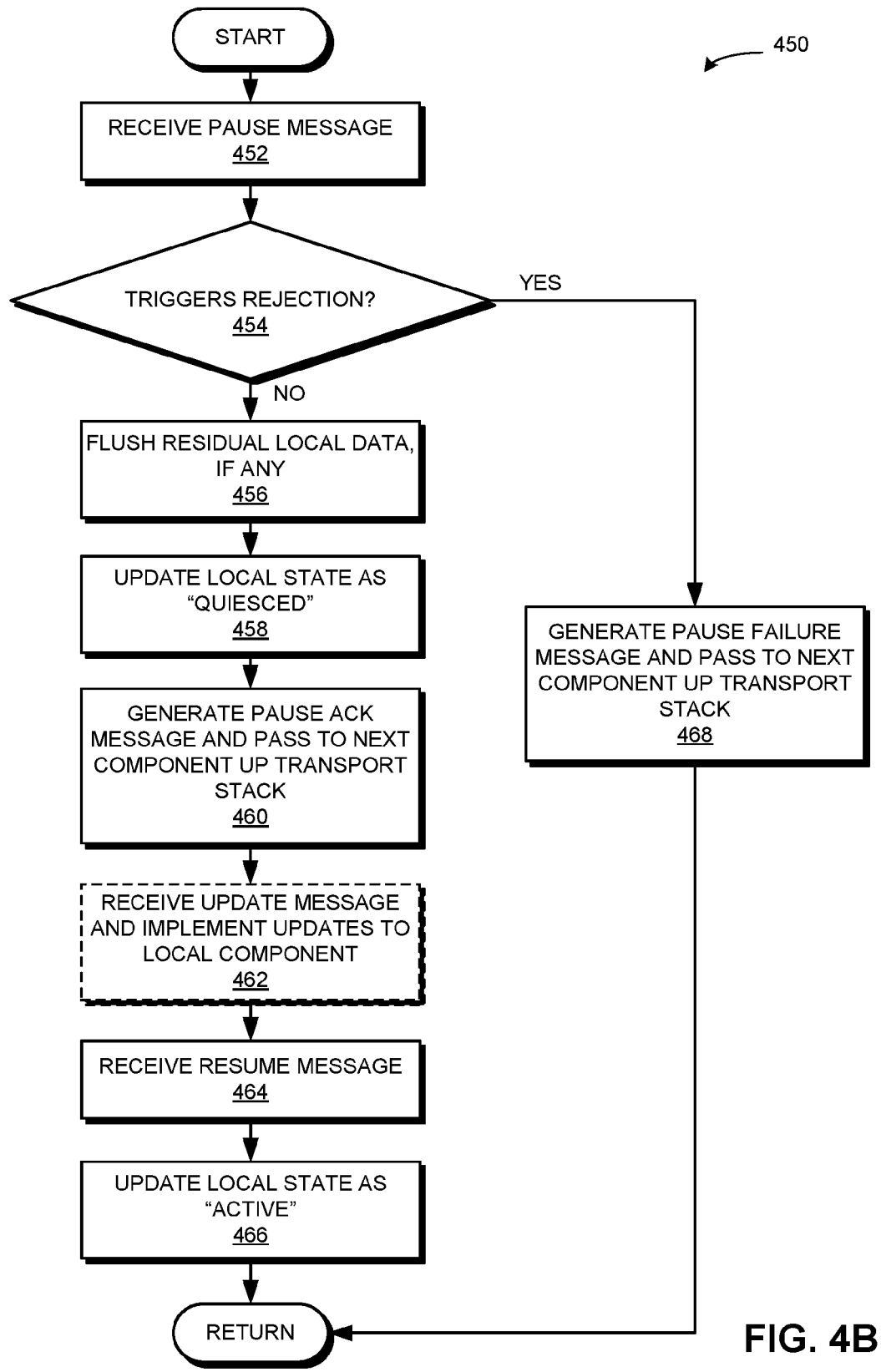
FIG. 4B presents a flow chart illustrating a method for quiescing and updating a final stack component of a transport stack, in accordance with an embodiment of the present invention.

FIG. 4B presents a flow chart 450 illustrating a method for quiescing and updating a final stack component of a transport stack, in accordance with an embodiment of the present invention. During operation, the component receives a pause message (operation 452) and checks whether the pause message triggers a rejection (operation 454). Reasons for rejection include, but are not limited to, processing a back flow or identifying inter-dependent messages. If the pause message triggers a rejection, the component generates a pause failure message and passes the pause failure message to the next component up the transport stack (operation 468).

If the pause message does not trigger a rejection, the component flushes residual local data, if any (operation 456) and sets the local state as "quiesced" (operation 458). The component then passes the pause acknowledgment message to the next component up the transport stack (operation 460). If the component is the updating component (denoted with dashed line), the component receives an update message and implements updates to the local component (operation 462). In some embodiments, the component can send an acknowledgment up the stack upon successfully updating the local component. The component then receives a resume message (operation 464) and sets the local state as "active" (operation 466).

Exemplary Apparatus and Computer System

Figure 5:
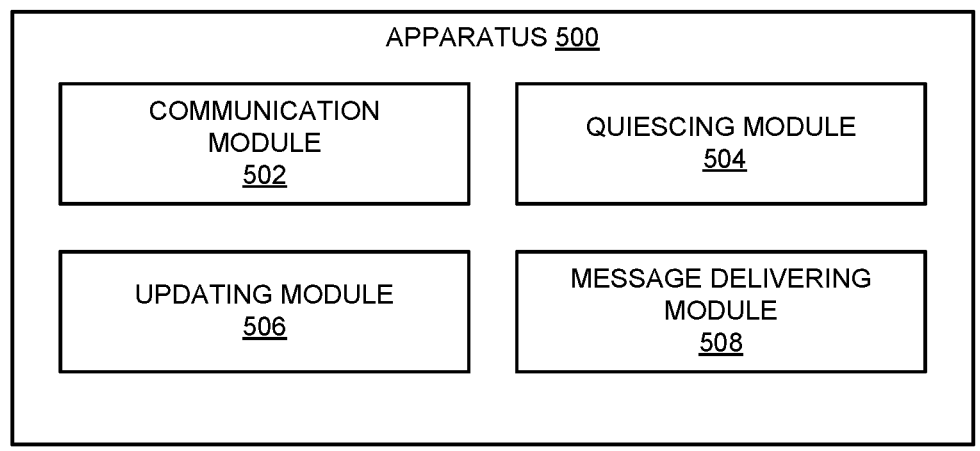
FIG. 5 illustrates an exemplary apparatus that facilitates updating a transport stack based on quiescing, in accordance with an embodiment of the present invention.

FIG. 5 illustrates an exemplary apparatus that facilitates updating a transport stack based on quiescing, in accordance with an embodiment of the present invention. Apparatus 500 can comprise a plurality of modules, which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device that is capable of communicating with other computer systems and/or devices. Specifically, apparatus 500 can comprise a communication module 502, a quiescing module 504, an updating module 506, and a message delivering module 508.

In some embodiments, communication module 502 can send and/or receive data packets to/from other network nodes across a computer network, such as a content centric network. Quiescing module 504 can set a state of a stack component as "quiesced" or "active" based on a pause message and a resume message, respectively. Quiescing module 504 can also generate an acknowledgment for the pause message. In some embodiments, quiescing module 504 can flush a local buffer of the component. Updating module 506 can update a component based on an update message. Message delivering module 508 can deliver a message to a component via a transport stack (e.g., can send a message up or down the stack).

Figure 6:
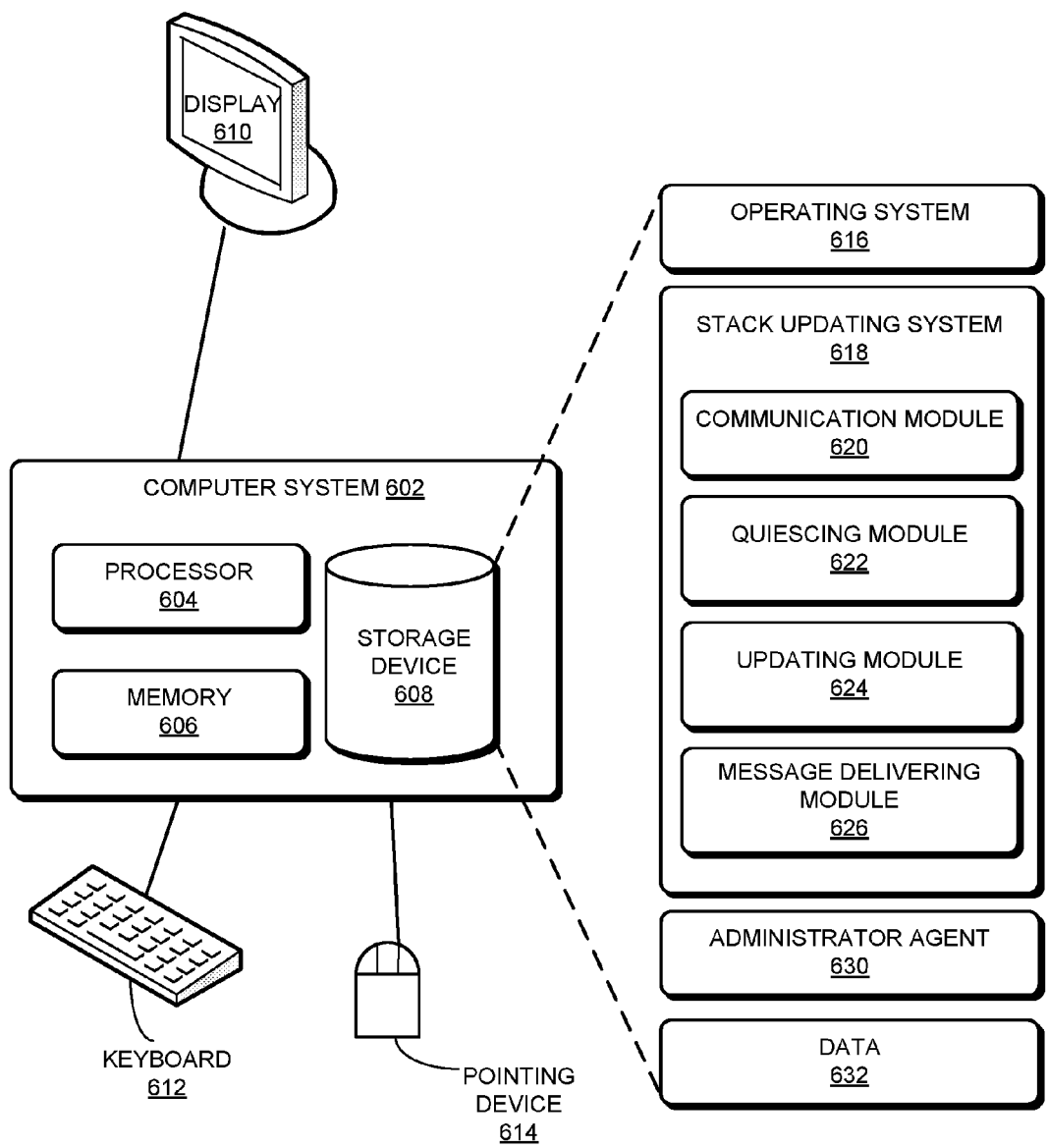
FIG. 6 illustrates an exemplary computer system that facilitates updating a transport stack based on quiescing, in accordance with an embodiment of the present invention.

FIG. 6 illustrates an exemplary computer system 602 that facilitates command messages to be communicated in a layer-agnostic manner, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a stack updating system 618, and data 632.

Stack updating system 618 can include instructions, which when executed by computer system 602 or processor 604, can cause computer system 602 or processor 604 to perform methods and/or processes described in this disclosure. Specifically, stack updating system 618 may include instructions for sending and/or receiving data packets to/from other network nodes across a computer network, such as a content centric network (communication module 620). Stack updating system 618 can also include instructions for setting a state of a stack component as "quiesced" or "active" based on a pause message and a resume message, respectively (quiescing module 622). Stack updating system 618 can also include instructions for generating an acknowledgment for the pause message and flushing a local buffer of the component (quiescing module 622).

Furthermore, stack updating system 618 can include instructions for updating a component based on an update message (updating module 624). Stack updating system 618 can include instructions for delivering a message to a component via a transport stack (e.g., can send a message up or down the stack) (message delivering module 626). Storage device 608 can store an administrator agent 630, which can generate and send a pause message, a resume message, and an update message for a transport stack.

Data 632 can include any data that is required as input or that is generated as output by the methods and/or processes described in this disclosure. Specifically, data 632 can include buffered messages by a respective component. Data 632 can also include a forwarding table of computer system 602.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   at a particular component of a plurality of components of a transport stack of a content centric network node:
   receiving a pause message while the particular component is processing interests and/or content objects;
   determining whether the pause message triggers a rejection; and
   if it is determined that the pause message does not trigger a rejection:
   setting a state of the particular component as quiesced such that the particular component is precluded from processing the interests and/or the content objects;
   receiving an update message configured to provide an update for the particular component;
   updating the particular component based on the update message while the state of the particular component is quiesced; and
   setting the state of the particular component as active such that the particular component resumes processing the interests and/or the content objects in accordance with the update.

2. The method of claim 1, wherein the particular component is a final component of the transport stack, the method further comprising:
   if it is determined that the pause message does not trigger the rejection:
   generating an acknowledgment message in response to receiving the pause message, wherein the acknowledgment message indicates that the pause message has been successfully processed by the plurality of components; and
   sending the acknowledgement message up the transport stack.

3. The method of claim 1, further comprising:
   if it is determined that the pause message triggers the rejection:
   sending a pause failure message up the transport stack, wherein the pause failure message indicates that the pause message has not been successfully processed by the plurality of components.

4. The method of claim 3, wherein determining that the pause message triggers the rejection includes one or more of: detecting a timeout event, processing a back flow, and identifying inter-dependent messages.

5. The method of claim 1, wherein the pause message is an interest message, the method further comprising:
   if it is determined that the pause message does not trigger the rejection:
   sending a control message to an administrator agent, wherein the control message transfers control to the administrator agent for updating the particular component.

6. The method of claim 1, wherein a name for the particular component of the transport stack is based on one or more of:
   a hierarchically structured variable length identifier (HSVLI), which comprises contiguous name components ordered from a most general level to a most specific level, wherein the HSVLI is applicable in a portal instance corresponding to the transport stack;
   a flat name that does not indicate any hierarchy;
   a role of the particular component of the transport stack; and
   a unique identifier which is specific to the particular component of the transport stack.

7. The method of claim 1, further comprising:
if it is determined that the pause message does not trigger the rejection:
flushing a local buffer of the particular component.

8. The method of claim 1, further comprising:
if it is determined that the pause message does not trigger the rejection:
receiving a resume message configured to instruct the particular component to set the state of the particular component as active.

9. A computer system for updating a transport stack, the system comprising:
a processor; and
a storage device storing instructions that when executed by the processor cause the processor to perform a method at a particular component of a plurality of components of the transport stack of a content centric network node, the method comprising:
receiving a pause message while the particular component is processing interests and/or content objects;
determining whether the pause message triggers a rejection; and
if it is determined that the pause message does not trigger a rejection:
setting a state of the particular component as quiesced such that the particular component is precluded from processing the interests and/or the content objects;
receiving an update message configured to provide an update for the particular component;
updating the particular component based on the update message while the state of the particular component is quiesced; and
setting the state of the particular component as active such that the particular component resumes processing the interests and/or the content objects in accordance with the update.

10. The computer system of claim 9, wherein the particular component is a final component of the transport stack, the method further comprising:
if it is determined that the pause message does not trigger the rejection:
generating an acknowledgment message in response to receiving the pause message, wherein the acknowledgment message indicates that the pause message has been successfully processed by the plurality of components; and
sending the acknowledgement message up the transport stack.

11. The computer system of claim 9, wherein the method further comprises:
if it is determined that the pause message triggers the rejection:
sending a pause failure message up the transport stack, wherein the pause failure message indicates that the pause message has not been successfully processed by the plurality of components.

12. The computer system of claim 11, wherein determining that the pause message triggers the rejection includes one or more of: detecting a timeout event, processing a back flow, and identifying inter-dependent messages.

13. The computer system of claim 9, wherein the pause message is an interest message, the method further comprising:
if it is determined that the pause message does not trigger the rejection:
sending a control message to an administrator agent, wherein the control message transfers control to the administrator agent for updating the particular component.

14. The computer system of claim 9, wherein a name for the particular component of the transport stack is based on one or more of:
a hierarchically structured variable length identifier (HSVLI), which comprises contiguous name components ordered from a most general level to a most specific level, wherein the HSVLI is applicable in a portal instance corresponding to the transport stack;
a flat name that does not indicate any hierarchy;
a role of the particular component of the transport stack; and
a unique identifier which is specific to the particular component of the transport stack.

15. A non-transitory computer-readable storage medium storing instructions that when executed by a processor cause the processor to perform a method at a particular component of a plurality of components of a transport stack of a content centric network node, the method comprising:
receiving a pause message while the particular component is processing interests and/or content objects;
determining whether the pause message triggers a rejection; and
if it is determined that the pause message does not trigger a rejection:
setting a state of the particular component as quiesced such that the particular component is precluded from processing the interests and/or the content objects;
receiving an update message configured to provide an update for the particular component;
updating the particular component based on the update message while the state of the particular component is quiesced; and
setting the state of the particular component as active such that the particular component resumes processing the interests and/or the content objects in accordance with the update.

16. The storage medium of claim 15, wherein the particular component is a final component of the transport stack, the method further comprising:
generating an acknowledgment message in response to receiving the pause message, wherein the acknowledgment message indicates that the pause message has been successfully processed by the plurality of components; and
sending the acknowledgement message up the transport stack.

17. The storage medium of claim 15, the method further comprising:
if it is determined that the pause message triggers the rejection:
sending a pause failure message up the transport stack, wherein the pause failure message indicates that the pause message has not been successfully processed by the plurality of components.

18. The storage medium of claim 17, wherein determining that the pause message triggers the rejection includes one or more of: detecting a timeout event, processing a back flow, and identifying inter-dependent messages.

19. The storage medium of claim 15, wherein the pause message is an interest message, the method further comprising:
if it is determined that the pause message does not trigger the rejection:

sending a control message to an administrator agent, wherein the control message transfers control to the administrator agent for updating the particular component.

20. The storage medium of claim 15, wherein a name for the particular component of the transport stack is based on one or more of:
- a hierarchically structured variable length identifier (HSVLI), which comprises contiguous name components ordered from a most general level to a most specific level, wherein the HSVLI is applicable in a portal instance corresponding to the transport stack;
- a flat name that does not indicate any hierarchy;
- a role of the particular component of the transport stack; and
- a unique identifier which is specific to the particular component of the transport stack.

* * * * *